United States Patent [19]

Ohmori

[11] Patent Number: 4,949,189
[45] Date of Patent: Aug. 14, 1990

[54] TWO-SIDED DOCUMENT SCANNING APPARATUS

[75] Inventor: Seishi Ohmori, Tokyo, Japan

[73] Assignee: Eastman Kodak Company, Rochester, N.Y.

[21] Appl. No.: 424,464

[22] Filed: Oct. 20, 1989

[30] Foreign Application Priority Data

May 2, 1989 [JP] Japan ................................. 1-112919

[51] Int. Cl.⁵ ............................................ H04N 1/04
[52] U.S. Cl. ................................... 358/474; 358/482; 358/496; 355/23
[58] Field of Search ............... 358/474, 496, 498, 450, 358/482, 483; 355/23, 46

[56] References Cited

U.S. PATENT DOCUMENTS

| | | | |
|---|---|---|---|
| 4,475,128 | 10/1984 | Koumura | 358/496 X |
| 4,571,636 | 2/1986 | Itoh | 358/496 X |
| 4,743,974 | 5/1988 | Lockwood | 358/498 X |

*Primary Examiner*—James J. Groody
*Assistant Examiner*—Victor R. Kostak
*Attorney, Agent, or Firm*—Raymond L. Owens

[57] ABSTRACT

A two-sided scanning apparatus for reading images which exist on both sides of a document to be read and supplying the read image data to a printer unit which prints front and back side images side-by-side. The apparatus comprises a first line sensor and a second line sensor for reading line by line images on the document to be read. Electrical signals representing the images on one line of the document read by scanning, which are outputted respectively from the first and second line sensors, are stored in sequence as serial data in a two-dimensional image memory of a printer unit.

6 Claims, 2 Drawing Sheets

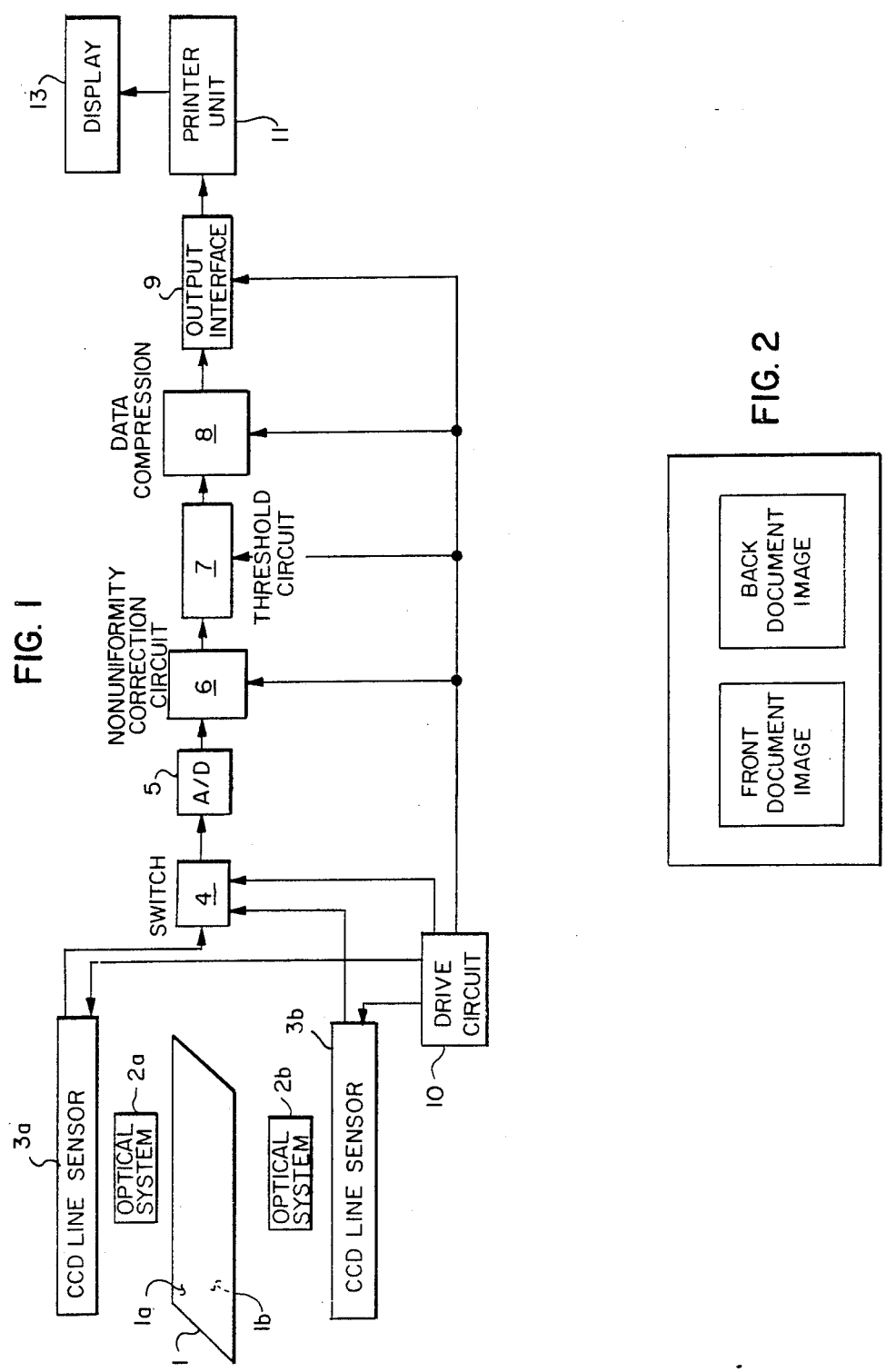

TWO-SIDED DOCUMENT SCANNING APPARATUS

BACKGROUND OF THE INVENTION

1. Field of the Ivention

The present invention relates to the scanning of images such as characters, marks, symbols, graphic images etc. printed on both sides of different kinds of documents, and then converting electrical signals representing such scanned images to digital data.

2. Description of the Prior Art

In order to obtain the image data of characters, graphic images, etc. from both sides of a document read by using an optical scanner, it is common proactice to first read the image data on one side of a document by means of a scanner. Thereafter the image data on the opposite side of the document is read by the scanner.

In this respect, in order for a conventional scanner to acquire the image data from a scanning operation both sides of a document, it would normally take at least twice as long as that required for the aquisition of image data from a single side of a document.

While the simultaneous reading of such image data from both sides of a document would make the scanning operation time shorter, in practice it would require two separate circuits, one for obtaining the image data from one side of an object and another circuit for obtaining data from the other side. As a consequence, such a dual-circuit arrangement would not only bring about a substantial increase in production costs, but also lead to a large-sized construction of a scanning apparatus. In addition, when it is desired to design a machine which can read both sides of a document such as a bank check which has an endorsement on the back thereof, if would be necessary to provide such a machine with the necessary structure for confirming that the images obtained are those taken from both sides of the same document.

SUMMARY OF THE INVENTION

The present invention has been made with the aim of solving the technical problems noted above. Therefore, it is an object of the invention to provide an effective two-sided document scanning apparatus which simultaneously reads image data from the two sides of a document.

To attain this object, the present invention comprises first line sensor means disposed facing one side of document to be read and operable so as to sequentially read different lines of an image existing on one side of the document, and to then output line signals representing the different lines of the image. Also, the present invention comprises second line sensor means disposed facing the other side of the document to be read and operable as to sequentially read the different lines of an image existing on the other side of the document and to then output line signals representing the different line portions of the image.

Control means enables the line signals to be alternately read by the first line sensor means and the second line sensor means. The output means supply the line signal read by the first line sensor means and then the line signal subsequently read by the second line sensor means as a single serial signal, either directly or after being subject to a predetermined signal processing operation, to a printer unit.

Alternatively, the line signal read by the first line sensor means and the line signal red by the second sensor means may be converted to digital data to be stored in corresponding line buffer means, respectively. The control means causes the digital data stored in these line buffer means to be read alternately. The digital data read by the first line buffer means and the digital data subsequently read by the second line buffer means are fed, as a single serial signal, directly or after being subjected to a predetermined signal processing, to a printer unit.

In this manner, the first line sensor means and the second line sensor means perform line-scanning on the images on the two sides of the document, one after the other, and then sequentially output the line signals. The control means causes the line signals to be alternately read by the first line sensor means and the second line sensor means. With this arrangement, the line signal read by the first line sensor means and the line signal subsequently read by the second line sensor means can be processed as a single serial signal.

According to the present invention, a line signal representing a line of an image on one side of a document such as printed material and a line signal representing a line image on the other side of the document are alternately taken out to form a single serial signal, thereby enabling these line signals to be treated as a line signal taken from the same side of the object. Accordingly, the present invention can provide a simple, compact and low-cost two-sided scanning apparatus capable of supplying signals representing images on both sides of the document to be read.

Furthermore, there is no need to confirm whether the obtained image data in the form of a single serial signal are from one and the same document.

The above and other objects, advantages and features of the present invention will become more apparent from the following detailed description thereof, when considered in conjunction with the accompanying drawings.

BRIEF DESCRIPTION OF THE DRAWINGS

The present invention will now be described in detail in connection with the preferred embodiments shown in the accompanying drawings, in which like parts are designated by like reference numerals.

FIG. 1 is a block diagram schematically showing the construction of a preferred embodiment of a two-side scanning apparatus according to the present invention;

FIG. 2 is a schematic diagram of an example of a representation on a display or of a print out showing front and back sides of document images acquired by the two-sided scanning apparatus of FIG. 1 and stored in a two-dimensional image memory;

DESCRIPTION OF THE PREFERRED EMBODIMENT OF THE INVENTION

Figure 3:
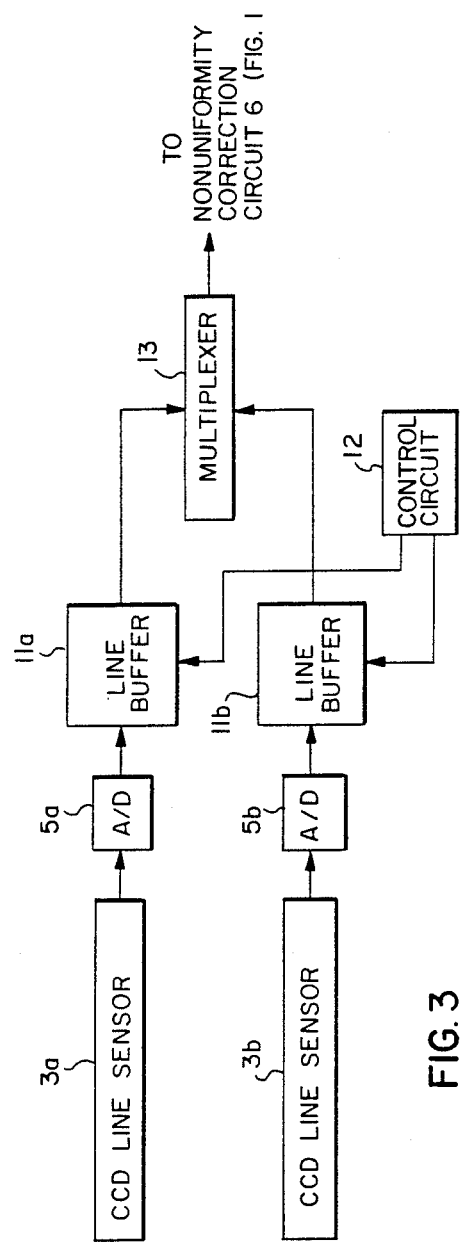
FIG. 3 is a block diagram schematically showing another embodiment of a scanning apparatus according to the present invention.

FIG. 1 is a block diagram which schematically shows a preferred embodiment of a two-sided scanner according to the present invention. Referring to this figure, a CCD line sensor 3A is disposed facing the front side 1A of a print, a drawing, a photograph, an object, etc. (hereinafter, referred to as "a document") 1. The document 1, an object to be read, has characters, sentences, pictures and the like on both sides thereof. An optical system 2A is disposed between the CCD line sensor 3A and the front side document 1. In a like manner, a CCD line sensor 3B faces the back side 1B of the document 1. An optical system 2B is disposed between the CCD line sensor 3B and the document 1.

Each of the CCD line sensors 3A and 3B includes a plurality of CCD elements which are arranged in an array in such a manner that the pictures of the images existing on the front side 1A and on the back side 1B of the document 1 may be focused on these line sensors by the corresponding optical systems 2A and 2B, respectively. With such an arrangement, when the document 1 is moved in a direction perpendicular to the CCD line sensors 3A and 3B facing the front and back sides of the document 1 from one end to the other end thereof in order to read the images on the document 1, different lines of the images on both the sides of the document 1 are read by the CCD lines sensors 3A and 3B in sequence. By reading the CCD line sensors 3A and 3B in a properly timed relationship with respect to the moving velocity of the document 1, signals representing different lines of the images on the two sides of the document 1 can be obtained from the CCD line sensors 3A and 3B sequentially. In other words, line scanning of the images on the two sides of the document 1 may be performed from one end to the other.

The output of the CCD line sensors 3A and 3B are connected to an analog switch 4, the output of which is in turn connected to an analog-to-digital (A/D) converter 5. The output of the A/D converter 5 is then connected through a nonuniformity correction circuit 6 and a threshold circuit 7 to a data compression circuit 8. The output of the data compression circuit 8 is supplied through an output interface 9 to be fed to an image memory (not shown) in a printer unit 11.

The CCD line sensors 3A and 3B are also connected to a driver circuit 10 in order to receive a CCD drive signal for reading the electrical charges stored in each of the CCD elements. The driver circuit 10 is also connected to the analog switch 4 for selecting either one of the CCD line sensors 3A and 3B, and in addition to the nonuniformity correction circuit 6, the threshold circuit 7, the data compression circuit 8 and the output interface 9 for supplying an end-of-line signal to these circuits.

Next, an operation of this embodiment will be explained assuming that the document 1 is moved, and that the CCD line sensors 3A and 3B are held stationary.

When the document 1 starts moving and a predetermined point of the document 1 comes to face the CCD lines sensors 3A and 3B, the driver circuit 10 sends a swtiching command to the analog switch 4 causing the switch 4 to select the CCD line sensor 3A, and then sends a CCD drive signal to the same sensor so that the electrical charges stored in each of the CCD elements of the CCD line sensor 3A are discharged in sequence.

Thus, from the CCD line sensor 3A, the electrical signals corresponding to the electrical charges stored in the CCD elements thereof may be obtained in sequence, thus forming a signal which represents the first line of the image existing on the front side 1A of the document 1. This image signal is then directed to the A/D converter 5 through the analog switch 4 and converter to digital image data.

Then, the driver circuit 10 sends a swtiching command signal to the analog switch 4 to have it switched to the CCD line sensor 3B and sends a CCD drive signal to this sensor 3B to have the electrical charges stored in the CCD elements in this CCD line sensor 3B discharged in sequence. In this manner, from the CCD sensor 3B, an electrical signal representing the first line of the image on the back side of the document 1 is output. This signal is then fed to the A/D converter 5 through the analog switch 4 and converted to digital image data.

The A/D converter 5 outputs serial digital data in which the image data representing the first line of the image on the front side 1A of the document 1 and the image data representing the first line of the image on the back side 1B thereof are arranged in a serial fashion. Hereinafter, such serial data will be referred to as "the serial data of the first line."

Thereafter, the serial data of the first line is fed to the nonuniformity correction circuit 6, where data processing is effected for correcting any irregularity in the serial data due to unequal sensitivities of the CCD line sensors 3A and 3B. Next, the thus-corrected serial data of the first line is processed in the threshold circuit 7, and then compressed in the data compression circuit 8. The serial data of the first line thus processed is then fed to the printer unit 11 by way of the output interface 9, and is then stored in the first storage location of the two-dimensional image memory (not shown). A display 13 is connected to the two-dimensional image memory in the printer unit 11 containing the front and back side document images (see FIG. 2). The printer circuit is adapted to print such front and back side document images side-by-side.

Upon the completion of such data processing steps, the driver circuit 10 sends an end-of-line signal to the nonuniformity correction circuit 6, the threshold circuit 7, the data compression circuit 8 and the output interface 9 thus causing these circuits to be prepared for the subsequent processing of the image data to follow. In this manner, the first line of the images existing on the two sides of the document 1 are read.

At this moment, the driver circuit 10 again has the analog switch 4 select the CCD line sensor 3A to cause signals representing the second line of the image on the front side 1A of the document 1 to be taken from the CCD line sensor 3A. These signals are then converted to digital image data by the A/D converter 5. Upon the completion of the acquisition of the signals from the CCD line sensor 3A, the driver circuit 10 then operates to have the analog switch 4 select the CCD line sensor 3B to obtain signals representing the second line of the image existing on the back side 1B of the document 1 from the CCD line sensor 3B, and such signals are then converted to digital image data by the A/D converter 5.

As a result of this operation the A/D converter 5 outputs the image data representing the second line of the image on the front side 1A of the document 1 and the image data representing the second line of the image on the back side 1B thereof are arranged in a serial fashion. Such serial data are referred to as the serial data of the second line.

The serial data of the second line from the A/D converter 5 are processed in a like manner as reviewed hereinbefore and taken out of the output interface 9 so as to be stored in the second storage location of the two-dimensional image memory. Thereafter, an end-ofline signal sent by the driver circuit 10 to the nonuniformity correction circuit 6, the threshold circuit 7, the data compression circuit 8 and the output interface 9, causing these circuits to be prepared for the subsequent processing of image data to follow. In like manner, the serial data of the third line, those of the fourth line, and so forth may be taken from the output interface 9 and stored in different storage locations of the two-dimensional image memory in sequence.

It should be noted in connection with such a procedure of data processing that the respective serial data comprising the image data representing one line of the image existing on the front side 1A of the document 1 and those representing one line of the image existing on the back side 1B thereof can be treated as image data obtained from a single line on the same side, and stored in the two-dimensional image memory in the printer unit 11.

Accordingly, when the serial data as stored in the two-dimensional image memory in the part of the printer unit are read in sequence from the successive storage locations, the whole image on the front side 1A and that on the back side 1B of the document 1 may not only be displayed side by side on the screen of the display 13, as shown in FIG. 2, but may also be printed side by side on a single surface of a record paper.

FIG. 3 is a block diagram showing the construction of another embodiment of a two-sided scanner according to the present invention, wherein like components are designated by like reference numerals. In this figure, the CCD line sensors 3A and 3B are disposed facing the printed sheet 1, as schematically shown in FIG. 1, and constructed such that the electrical charges may be discharged from each of the CCD line sensors 3A and 3B upon the receipt of the CCD drive signal from the driver circuit 10. The outputs of the CCD line sensors 3A and 3B are connected to line buffers 11A and 11B through the A/D converters 5A and 5B, respectively. The line buffers 11A and 11B read and write data under the control of a control circuit 12.

The outputs from the line buffers 11A and 11B are fed to the nonuniformity correction circuit 6 through a multiplexer 13 and processed in a manner similar to the case shown in FIG. 1.

In the operation of another embodiment of the invention, the electrical charges stored in each of the storage elements of the CCD line sensors 3A and 3B are discharged upon the receipt of the CCD drive signal from the driver circuit 10. The thus obtained signals output from the CCD line sensors 3A and 3B are then converted to digital image data by way of the A/D converters 5A and 5B, and written, under to control of the control circuit 12, in the corresponding line buffers 11A and 11B to be temporarily stored. Then, the image data are read from one of the line buffers 11A and 11B, and upon the completion of this reading operation the image data are read from the other line buffer.

The image data read from each of the line buffers 11A and 11B are fed to the nonuniformity correction circuit 6 through the multiplexer 13, and processed in the same manner as explained in connection with the first embodiment of the invention shown in FIG. 1. The thus processed image data are sent as serial data from the output interface 9 to the printer unit, and then stored in the two-dimensional image memory as in the case shown in FIG. 1.

Figure 4:
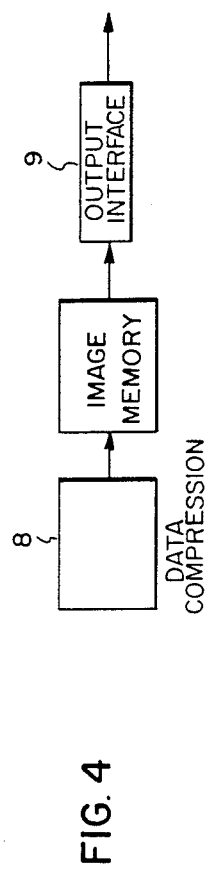
FIG. 4 is a block diagram showing a modification to the embodiments of the two-sided scanning apparatus of the present invention.

The invention has been described in detail with particular reference to certain preferred embodiments thereof, but it will be understood that these embodiments are merely illustrative, and that variations and modifications can be effected within the spirit and scope of the invention. For example, the two-dimensional image memory may be provided in the scanner rather than in the printer unit, so as to be placed between the data compression circuit 8 and the output interface 9, as schematically shown in FIG. 4. In this case, it may be possible that the output interface 9 begins reading the two-dimensional iamge memory in response to the completion of scanning both the sides of the document 1 so as to send serial data in sequence to the printer unit, or that the serial data are read from the two-dimensional image memory in asynchronism with the writing of serial data therein.

The embodiments described above employ a mechanical scanning system where the document is moved for such as to allow the images on both sides thereof to be read, but instead the optical systems 2A and 2B may be designed such that, by holding the document and the both upper and lower CCD line sensors stationary, the optical systems 2A and 2B optically scan the images on both sides of the document line by line such as to cause each line of the images on the front and back sides of the document to be focused in sequence upon the CCD type line sensors.

In place of the CCD line sensor of optical reduction type employed in the embodiments explained hereinbefore, line sensors of a direct-contact type may be used. Also, MOS type line image sensors can be used instead of CCD line sensors.

The invention has been described in detail with particular reference to a certain preferred embodiment thereof, but it will be understood that variations and modifications can be effected within the spirit and scope of the invention.

What is claimed:

1. A two-sided scanning apparatus for reading image which exists on each side of a document to be read and supplying the read image data to a printer unit adapted to print front and back side images side-by-side, comprising:
    first line sensor means disposed facing the front side of the document and operable to read in sequence different lines of the image existing on the front side of the document and store output line signals representing the different lines of the image read on the front side of the document;
    second line sensor means disposed facing the back side of the document, and operable to read in sequence different lines of the image existing on the back side of the document, and output line signals representing the different lines of the image read on the back side of the document;
    control means operable to cause the line signals to be alternately read from said first and second sensor means; and
    output means operable to alternately supply a line signal read by said first line sensor means and then a corresponding line signal read by said second sensor means to said printer unit which prints such front and back side document images side-by-side.

2. The two-sided scanning apparatus of claim 1 wherein the line signal read by said first line sensor means and the line signal subsequently read by said second line sensor means are provided as a single serial signal from said output means.

3. Apparatus as claimed in claim 2 wherein said control means comprises a switch means operable to switch between said first line sensor means and said second line sensor means each time the reading of each line signal is completed, and alternately output the line signals from said first, line sensor means and said second line sensor means, and wherein said output means comprises conversion means for converting each of the line signals output from said switch means to digital data, and an output interface means operable to output in sequence the digital data corresponding to the line signal read by said first line sensor means and the digital data corresponding to the line signal subsequently read by said second line sensors means as a single serial signal.

4. Apparatus as claimed in claim 3 wherein said output means further comprises an image storing means disposed between said conversion means and said output interface means, said image storing means being operable to store in sequence, in different storage locations, the digital data corresponding to the line signal read by said first line sensor means and the digital data corresponding to the line signal subsequently read by said second line sensor means as a serial signal.

5. A two-sided scanning apparatus for reading images which exists on each side of a document to be read and supplying the read image data to processing circuits including a printer unit adapted to print front and back side images side-by-side, comprising:

first line sensor means disposed facing the front side of a document, and operable to read in sequence different lines of the image existing on the front side of the document and output line signals representing the different lines of the image read by said first sensor means;

second line sensor means disposed facing the back side of the document, and operable to read in sequence different lines of the image existing on the back side of said object and output line signals representing the different lines of the image read by said second sensor means;

first conversion means for converting each of the line signals output from said first line sensor means to digital data;

second conversion means for converting each of the line signals output from said second line sensor means to digital data;

first line buffer means operable to store the digital data corresponding to the line signal output from said first conversion means;

second line buffer means operable to store the digital dat corresponding to the line signal output from said second conversion means;

control means operable to cause the digital data stored in said first line buffer means and said second line buffer means to be alternately read;

output means operable to alternately receive the digital data from said first line buffer means and said second line buffer means to output in sequence the digital data corresponding to the line signal read by said first line sensor means and the digital data corresponding to the line signal subsequently read by said second line sensor means as a serial signal to said processing circuits.

6. Apparatus as claimed in claim 5, wherein said signal processing means comprises image storing means, operable to store in sequence, in different storage locations, the digital data corresponding to the line signal read by said first line sensor means and the digital data corresponding to the line signal subsequently read by said second line sensor means as a serial signal.

* * * * *